US011597475B2

(12) United States Patent
Price et al.

(10) Patent No.: US 11,597,475 B2
(45) Date of Patent: *Mar. 7, 2023

(54) FULLY TELESCOPING DEVICE MOUNT

(71) Applicant: BeatDown Outdoor Products, LLC, Sedalia, MO (US)

(72) Inventors: Todd Price, Sedalia, MO (US); Blake Price, Sedalia, MO (US)

(73) Assignee: BeatDown Outdoor Products, LLC, Sedalia, MO (US)

( * ) Notice: Subject to any disclaimer, the term of this patent is extended or adjusted under 35 U.S.C. 154(b) by 56 days.

This patent is subject to a terminal disclaimer.

(21) Appl. No.: 16/923,740

(22) Filed: Jul. 8, 2020

(65) Prior Publication Data

US 2022/0009591 A1 Jan. 13, 2022

(51) Int. Cl.
*B63B 17/00* (2006.01)
*B63B 83/00* (2020.01)

(52) U.S. Cl.
CPC .............. *B63B 17/00* (2013.01); *B63B 83/00* (2020.01); *B63B 2017/0054* (2013.01)

(58) Field of Classification Search
CPC .. B63B 17/00; B63B 83/00; B63B 2017/0054
USPC ........................................................ 114/364
See application file for complete search history.

(56) References Cited

U.S. PATENT DOCUMENTS

| 8,413,936 | B2* | 4/2013 | Wang | F16M 11/28 396/419 |
| 8,430,051 | B1* | 4/2013 | Allison | B63B 49/00 114/364 |
| 11,021,215 | B1* | 6/2021 | Price | B63B 17/00 |

* cited by examiner

*Primary Examiner* — Lars A Olson
(74) *Attorney, Agent, or Firm* — Shook, Hardy & Bacon, LLP

(57) ABSTRACT

A telescoping device mount is configured to hold an electronic device. The telescoping device mount is configured to fully extend or fully retract the electronic device. The telescoping device mount includes a telescoping post, a mount segment, and a base. The telescoping post includes an inner post segment and an outer post segment. The mount segment is configured to secure an electronic device thereto. The mount segment includes an outer collar slidably securable to the outer post segment of the telescoping post. The base is secured to the inner post segment such that the outer post segment telescopes relative to the inner post segment. In a fully retracted position, the electronic device is proximate to the base and/or an underlying surface.

20 Claims, 13 Drawing Sheets

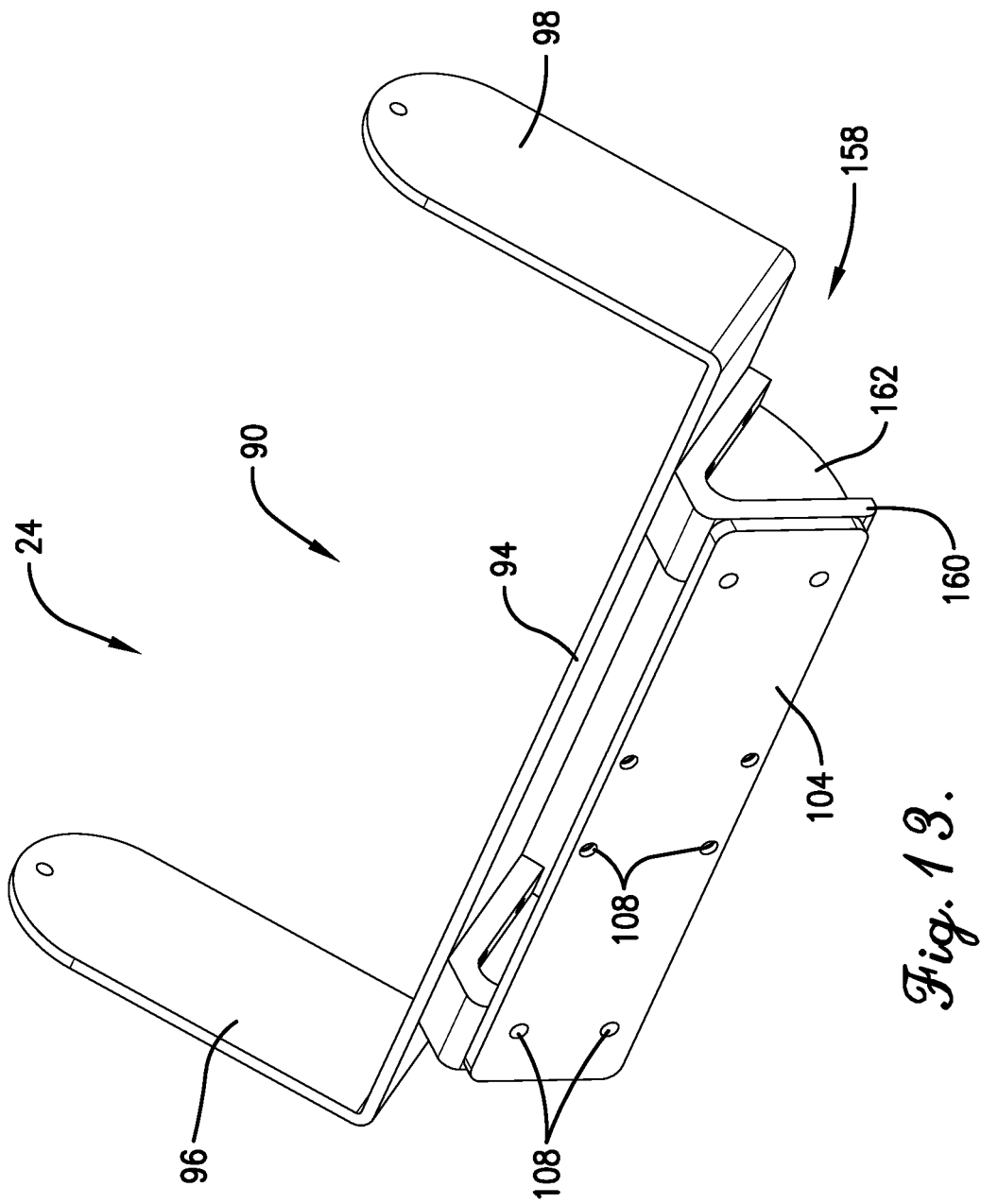

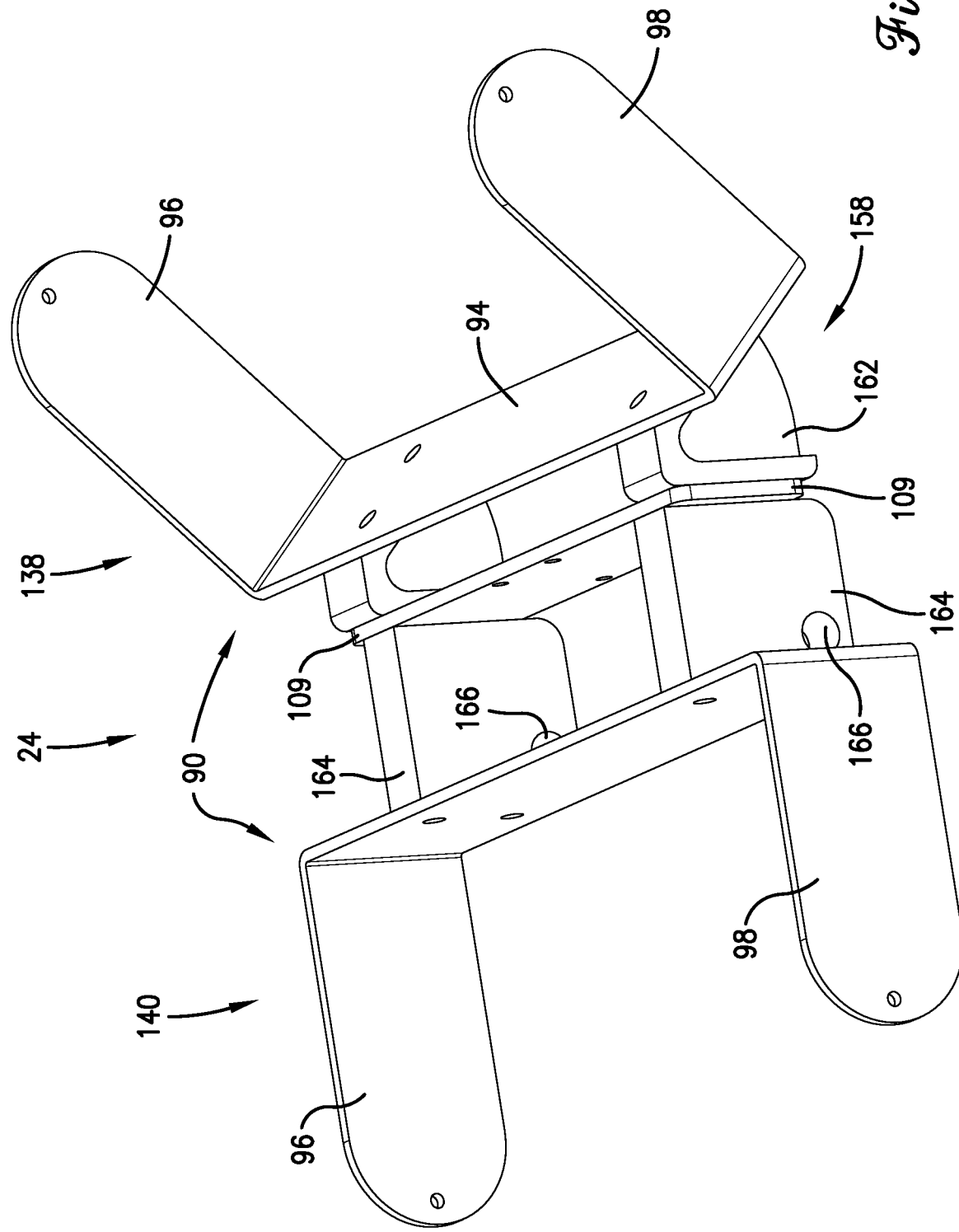

FULLY TELESCOPING DEVICE MOUNT

FIELD OF THE INVENTION

The present disclosure generally relates to mounts for electronic devices. More specifically, the present disclosure generally relates to telescoping mounts for electronic devices on a vehicle, such as a watercraft.

BACKGROUND

Various independent electronic devices may be utilized on any of various vehicles. For example, a boater may add an electronic fish finder to a boat to assist the boater in locating fish relative to the boat. The electronic device may be used intermittently, such that it is not needed during all activities. Thus, the user may desire to lower the electronic device while not in use.

Existing telescoping mounts only allow for a limited range of motion. Thus, even when fully lowered, the electronic device on the telescoping mount is still in an intermediate position. What is lacking in the prior art is a telescoping mount that allows the electronic device to be disposed fully against an underlying surface.

This background discussion is intended to provide information related to the present invention which is not necessarily prior art.

BRIEF SUMMARY

Embodiments of the invention solve the above-mentioned problem (as well as other problems) by providing a fully telescoping device mount. The fully telescoping mount allows the user to move the electronic device from a raised, prominent position to a lowered position adjacent to an underlying surface. The electronic device being disposed in the lowered position is more stable and less of an obstruction while the electronic device is not in use.

A first embodiment of the invention is broadly directed to a telescoping device mount configured to hold an electronic device on a vehicle, the telescoping device mount comprising a telescoping post, a mount segment, and a base. The telescoping post includes an inner post segment and an outer post segment. The mount segment is configured to secure an electronic device thereto. The mount segment includes an outer collar slidably securable to the outer post segment of the telescoping post. The base is secured to the inner post segment such that the outer post segment telescopes upward and downward relative to the inner post segment.

A second embodiment of the invention is broadly directed to a method of utilizing an electronic device on a vehicle, the method comprising: releasing a post lock of a telescoping post; raising an outer post segment relative to an inner post segment, wherein the inner post segment is secured to the vehicle via a base; releasing a collar lock of a mount segment; raising the mount segment relative to the outer post; and altering an angle of a device in the mount segment relative to the telescoping post.

A third embodiment of the invention is broadly directed to a mounted electronic device system comprising an electronic device and a telescoping device mount. The electronic device has a display. The telescoping device mount is configured to hold the electronic device. The telescoping device mount includes a telescoping post, a mount segment, and a base. The telescoping post includes an inner post segment and an outer post segment. The mount segment is configured to secure the electronic device thereto. The mount segment includes an outer collar slidably securable to the outer post segment of the telescoping post. The base is secured to the inner post segment such that the outer post segment telescopes relative to the inner post segment. The base is configured to be secured to an underlying surface, such as a vehicle. The telescoping device mount is configured to be disposed in a full retraction position and a full extension position, wherein in the full retraction position the electronic device is proximate to the underlying surface such that the electronic device is stowed. The underlying surface is a vehicle.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

FIG. 13 is a perspective view of an first alternative embodiment of a yoke; and

FIG. 14 is a perspective view of a second alternative embodiment of a yoke.

Figure 1:
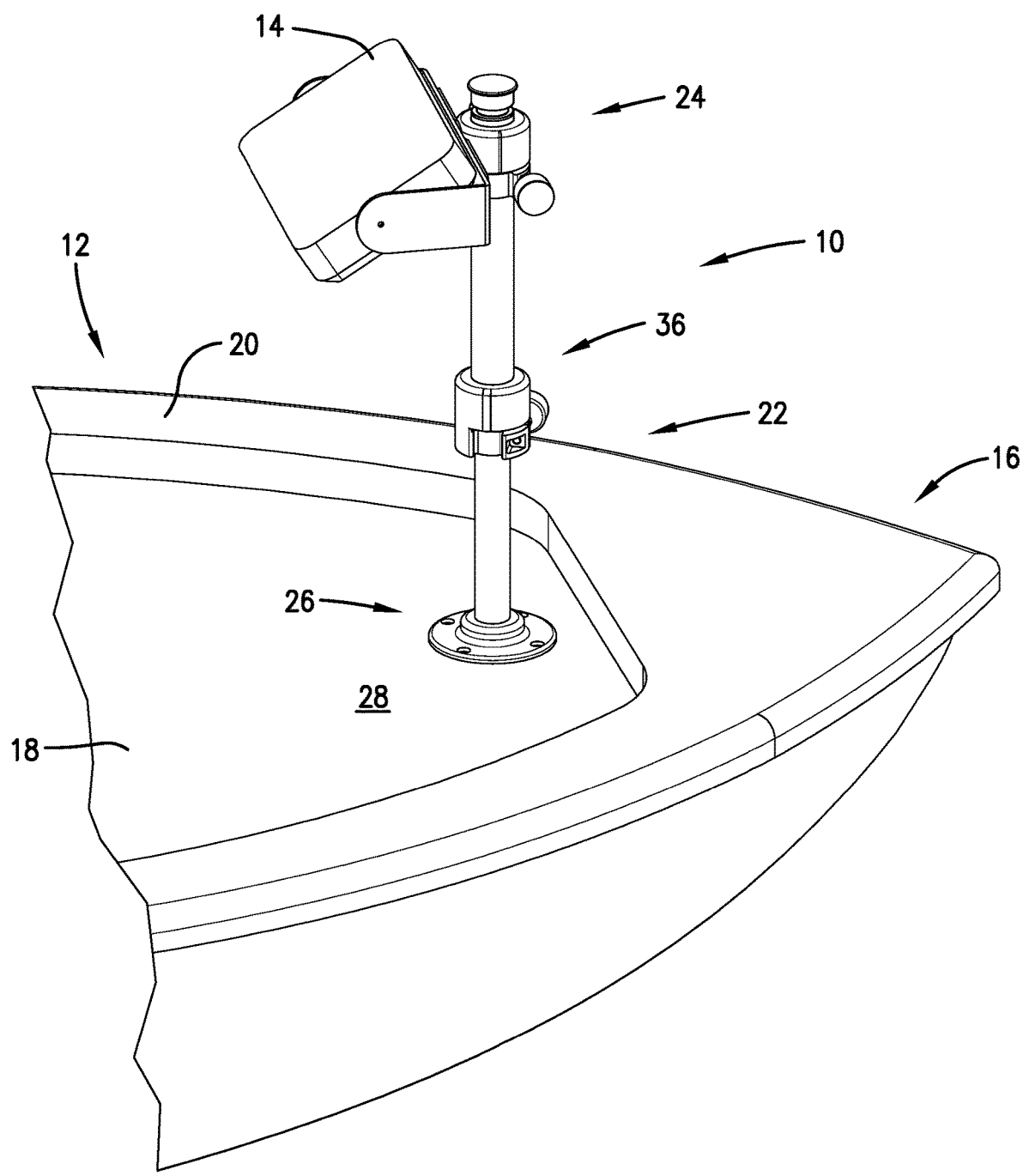
FIG. 1 is an exemplary environmental view showing usage of an electronic device on a fully telescoping device mount in a boat.

The Figures depict exemplary embodiments for purposes of illustration only. One skilled in the art will readily recognize from the following discussion that alternative embodiments of the systems and methods illustrated herein may be employed without departing from the principles of the invention described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments. For instance, the drawing figures do not limit the present invention to the specific embodiments disclosed and described herein. Furthermore, directional references (for example, top, bottom, up, and down) are used herein solely for the sake of convenience and should be understood only in relation to each other. For instance, a component might in practice be oriented such that faces referred to as "top" and "bottom" are sideways, angled or inverted relative to the chosen frame of reference.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

Exemplary Environment and Usages

Embodiments of the invention are directed to a telescoping device mount 10. Embodiments of the invention may be utilized in any of various environments. An exemplary environment is shown in FIG. 1 and discussed below. However, it should be appreciated that this environment is only exemplary and that various embodiments of the invention may be utilized in other environments.

Turning to FIG. 1, an exemplary environment for embodiments of the invention is shown. A first exemplary purpose for embodiments of the invention is in boating. The exemplary environment may include a boat 12 or other watercraft configured to hold one or more embodiments of the invention. The user may desire to add one or more electronic devices 14 to the boat 12. The electronic devices 14 may assist the user in performing any of various functions related to or otherwise utilizing the boat 12. The electronic device 14 may assist the user in boat operation, fishing, navigation, entertainment, autopilot, or other functions. The electronic device 14 is mounted so as to dispose the electronic device 14 at a desired height and angle.

Examples of electronic devices 14 that may be utilized on a boat 12 include a fish finder, a transducer, a chart plotter, a radar screen, a wind vane, a radar, a GPS or other location-determining device, a television or other entertainment device, an audio antenna, a cable antenna, a VHF antenna, an LTE antenna, a monitor, an autopilot display, any of various instrumentation, a set of telematics controls, an electronic picture frame, and other devices. The electronic device 14 may include any combination of the above-mentioned structures as well, as well as other structures.

In many instances, the user may desire to use the electronic device 14 intermittently. In these instances, the user may desire to move the electronic device 14 to a less obtrusive height and angle. This is because the electronic device 14 may only need to be used intermittently. For example, a fish finder electronic device 14 may only be needed during fishing. Thus, the user may desire to store the fish finder electronic device 14 in an unobtrusive height and angle during non-use and display the fish finder electronic device 14 at a prominent height and angle during use.

FIG. 1 shows the telescoping device mount 10 in use for the first exemplary purpose. FIG. 1 shows a bow end 16 of the boat 12 so as to present an exemplary mounting location of the electronic device 14. Shown is the telescoping device mount 10 and the electronic device 14 disposed on the boat 12. Embodiments of the invention may be configured to be secured to any of various locations or structures on the boat 12. As a first example, embodiments of the invention may be configured to be secured to a foredeck 18 of the boat 12, as shown in FIG. 1. The foredeck 18 is a deck at the bow end 16 of the boat 12. Embodiments of the invention may be configured to be secured to the foredeck 18 such that access to an underside is accessible for securing of the telescoping device mount 10.

As a second example, not illustrated, embodiments of the invention may be configured to be secured to a gunwale 20 of the boat 12. The gunwale 20 is an upper edge of the hull of the boat 12. As a third example, not illustrated, embodiments of the invention may be configured to be secured to a transom of the boat 12. The transom is an upper edge at a stern end of the boat 12. As a fourth example, not illustrated, embodiments of the invention may be configured to be secured to a floorboard of the boat 12, such as in a cockpit of the boat 12. As a fifth example, embodiments of the invention may be configured to be secured to a helm of the boat 12. The helm includes other instruments and/or electronic devices 14 for the boat 12. Some embodiments may also be configured to be secured to the floorboard adjacent to the helm, such that the user may bring the electronic device 14 up as needed without permanently installing the electronic device 14 in the helm.

A second exemplary purpose is for automobiles. In these embodiments, not illustrated, the electronic device 14 may be intermittently used such that it is easy to place into a prominent height and angle during use. As an example, embodiments of the invention may be utilized for taxi or ride sharing applications. When the user is engaging in taxi or ride sharing activities, the electronic device 14 may be prominently displayed. During other usage of the automobile, the electronic device 14 may be stowed in another location that is easily accessible.

A third exemplary purpose is for agricultural and construction equipment. In these embodiments, not illustrated, the electronic device 14 may be intermittently used for a certain tool or attachment. The electronic device 14 may be prominently displayed while the tool or attachment is being used and stowed in other times.

A fourth exemplary purpose is for aircraft. In these embodiments, not illustrated, the electronic device 14 may be intermittently used for certain functions and stowed in other times.

A fifth exemplary purpose is for cameras. In these embodiments, the electronic device 14 may be desired for use at a large range of vertical locations. For example, the desired shot may include moving between a location adjacent to an underlying surface 28 and a raised location. Existing tripods and other camera support structures do not include telescoping functions that will perform this function.

It should be appreciated that while the portions of the description herein relate to the boating exemplary purpose, various embodiments may be directed to other or multiple purposes. The boating purpose is discussed to provide an easily understandable example to the reader.

Exemplary Fully Telescoping Device Mount

Figure 2:
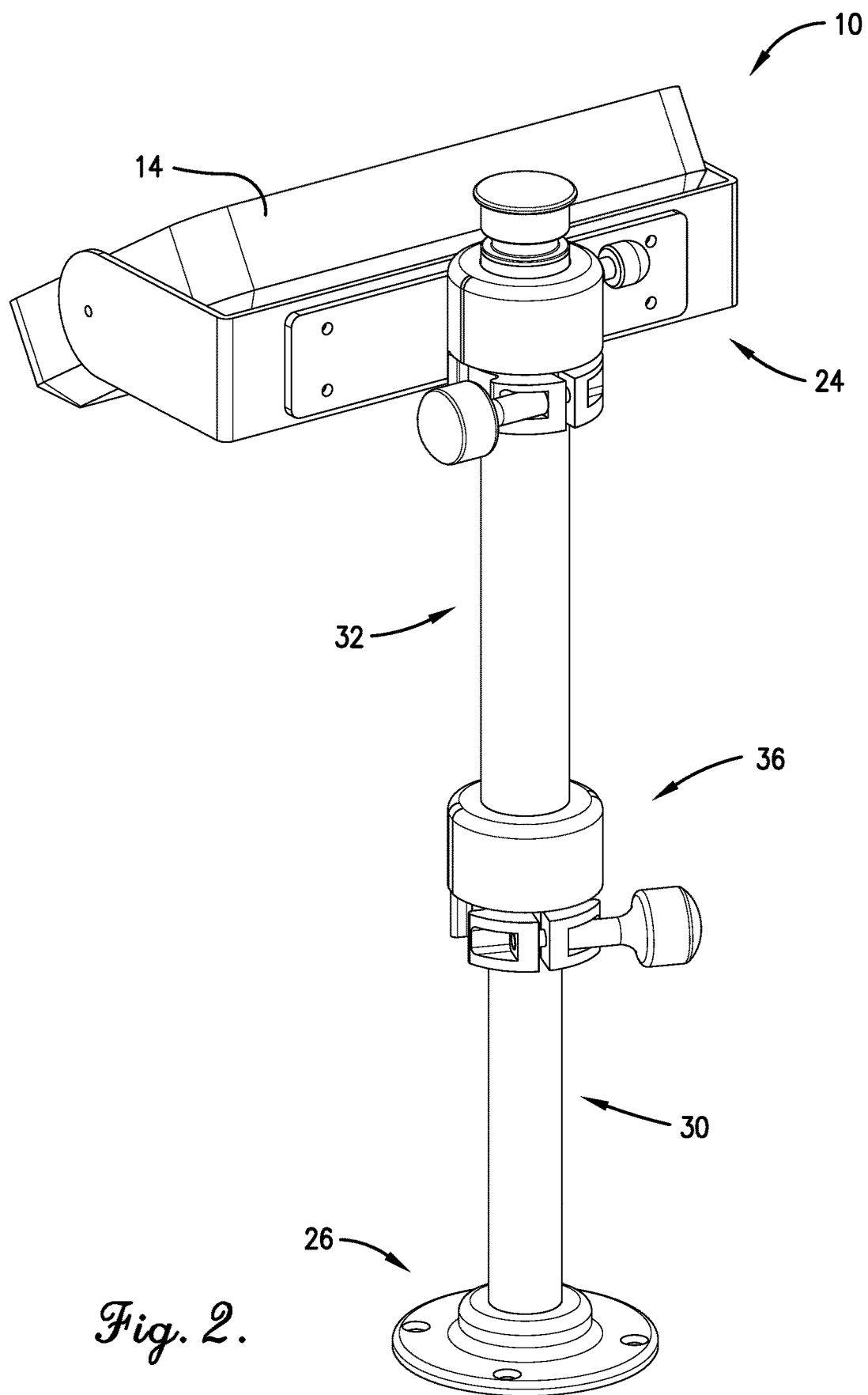
FIG. 2 is a perspective view showing a fully telescoping device mount having an electronic device thereon, shown in a fully extended position.
Figure 3:
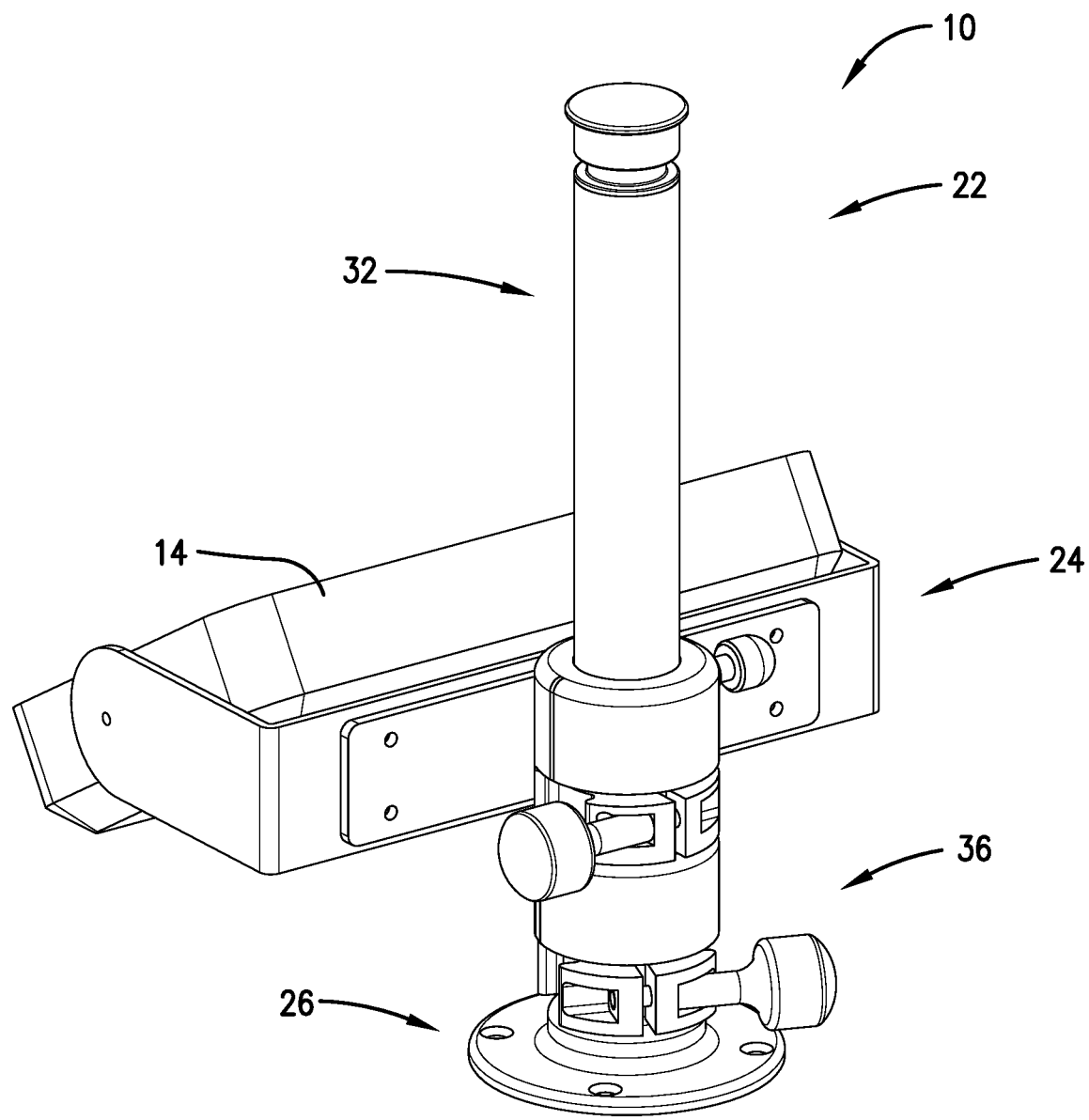
FIG. 3 is a perspective view of the fully telescoping device mount of FIG. 2, shown in a fully retracted position with the electronic device adjacent an underlying surface.
Figure 4:
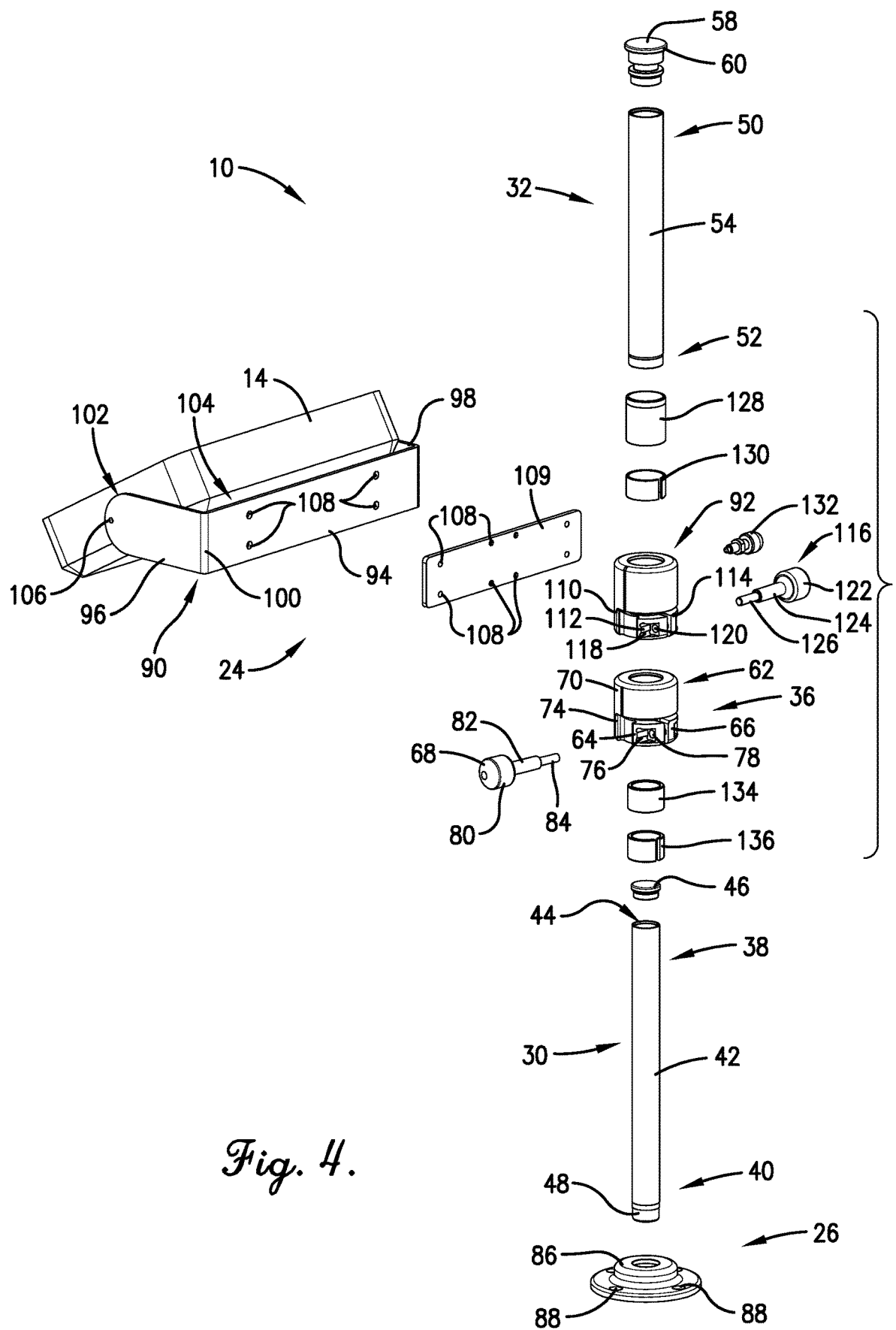
FIG. 4 is an exploded view of the fully telescoping device mount.
Figure 5:
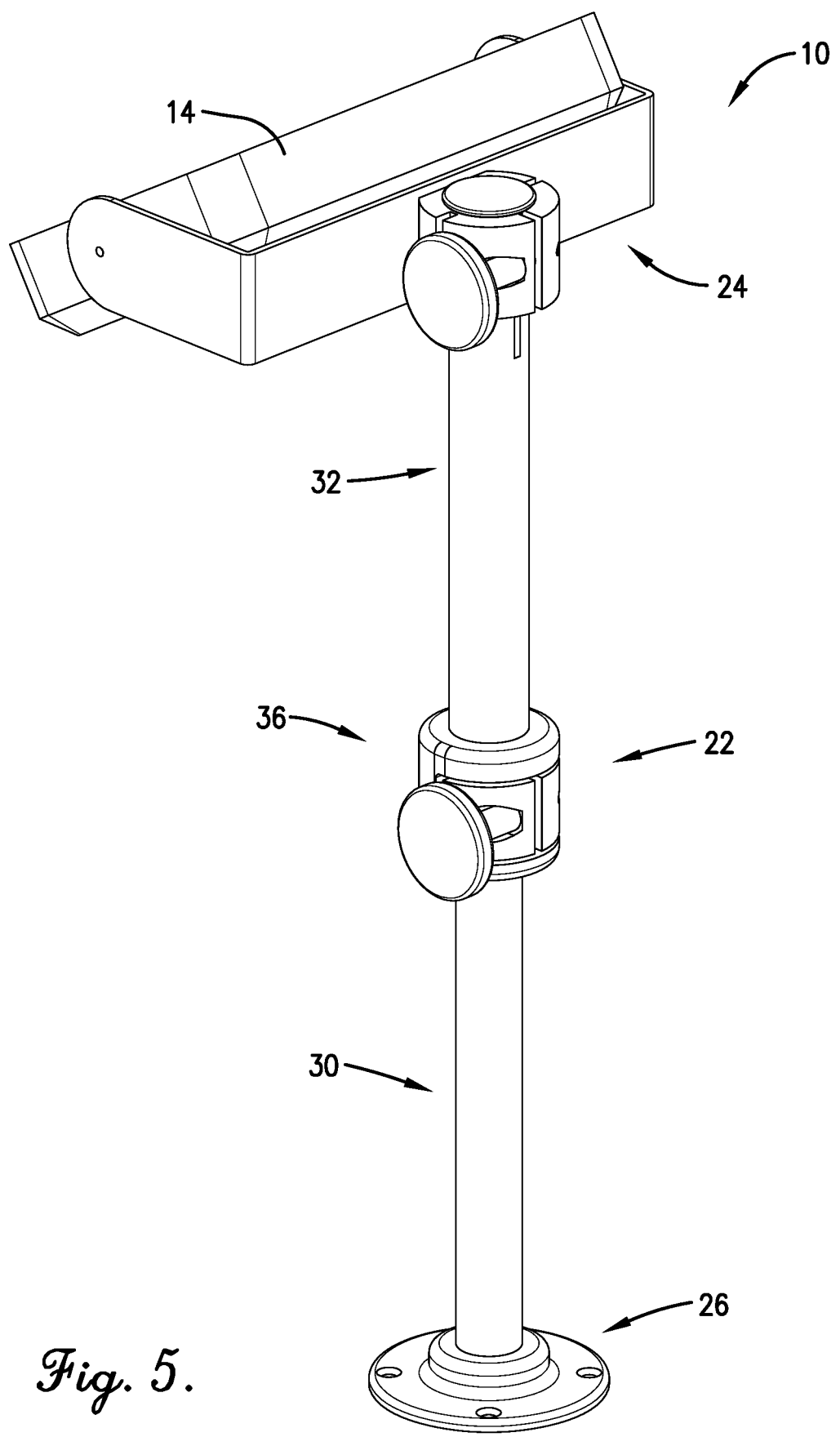
FIG. 5 is a perspective view of a first alternative embodiment of a telescoping device mount, shown in the fully extended position.

Turning to FIGS. 2-4, an exemplary embodiment of the fully telescoping device mount 10 is shown from various views. FIGS. 2 and 3 both show a perspective view of the fully telescoping device mount 10 with the electronic device 14 secured thereon. In FIG. 2, the fully telescoping device mount 10 is in a fully extended position. In FIG. 3, the fully telescoping device mount 10 is in a fully retracted position. FIG. 4 shows an exploded view of the various components of the fully telescoping device mount 10.

The fully telescoping device mount 10 comprises a telescoping post 22, a mount segment 24, and a base 26. The telescoping post 22 is disposed between the mount segment 24 and the base 26. The base 26 is configured to be secured to an underlying surface 28 (as shown in FIG. 1. The underlying surface 28 may be a vehicle, such as of the types discussed above. The mount segment 24 is configured to support an electronic device 14 at a certain elevation and/or angle relative to the underlying surface 28, as best shown in FIG. 1.

The telescoping post 22 includes an inner post segment 30 and an outer post segment 32. The inner post segment 30 is at least partially disposed within the outer post segment 32. The telescoping post 22 is configured to be disposed in an extended position (as shown in FIG. 2) and a retracted position (as shown in FIG. 3), as well as in any intermediate position (not illustrated). The inner post segment 30 is secured to the base 26, such that the outer post segment 32 telescopes upward relative to the base 26 as well as the inner post segment 30. This is distinct from the standard telescoping post configuration in which a base is secured to an outer post segment and the inner post segment telescopes relative thereto. By disposing the outer post segment 32 toward a top end, the mount segment 24 can achieve a greater range of motion compared to a similarly sized traditional telescoping post.

The mount segment 24 is configured to secure an electronic device 14 thereto. The mount segment 24 includes an outer collar 34 slidably securable to the outer post segment 32 of the telescoping post 22. The outer collar 34 slides up and down on the outer post segment 32. The outer collar 34 is thus capable of being disposed toward an upper end of the outer post segment 32 (referred to as an elevated position, as shown in FIG. 2) or toward a lower end (referred to as a lowered position, as shown in FIG. 3), as well as in any intermediate positions. As such, as shown in FIG. 3, the outer collar 34 can be place adjacent to the underlying surface 28 when the telescoping post 22 is retracted and the outer collar 34 is in the lowered position.

Thus, the mount segment 24 is configured to be raised relative to the base 26 in a fully extended position, as shown in FIG. 2; as well as configured to be proximate to the base 26 in a fully retracted position, as shown in FIG. 3. Further, as can be seen in FIG. 3, at least a portion of the telescoping post 22 extends above the mount segment 24 while the mount segment 24 is in the fully retracted position. This may provide benefits, such as a graspable handle (such as a stanchion) that the user, or other person, may utilize during operation of the vehicle while the electronic device 14 is not in use.

Exemplary Telescoping Post

Turning now to FIGS. 4 and 7-9, the telescoping post 22 is shown in more detail. The telescoping post 22 of embodiments comprises the outer post segment 32, the inner post segment 30, and a post lock 36. The inner post segment 30 is secured to the base 26, such that the inner post remains in contact with the underlying surface 28 (such as the vehicle discussed above). The post lock 36 selectively secures the outer post segment 32 relative to the inner post segment 30 such that the relative positions thereof are maintained. The post lock 36 may be unlocked, the outer post segment 32 slid relative to the inner post segment 30, and the post lock 36 locked.

The inner post segment 30 of embodiments is a generally elongated cylinder shape, presenting an upper end 38 and a lower end 40, as best shown in FIG. 4. The inner post segment 30 includes a cylindrical wall 42. The cylindrical wall 42 presents an inner void 44 (also shown in FIG. 8). The inner post segment 30 may also include an inner cap 46. The inner cap 46 is disposed at the upper end 38 of the inner post segment 30. The inner cap 46 interfaces with the outer post segment 32 disposed thereon. The inner cap 46 may thus act as a linear bearing, allowing for and/or facilitating movement in a single, axial direction.

The inner post segment 30 may include a base interface 48 (shown in FIGS. 4, 8, and 9) at the lower end. The base interface 48 is configured to fit within or otherwise be secured to the base 26. In some embodiments, the base interface 48 may include a helical protrusion (not illustrated) configured to complement a threaded segment (not illustrated) of the base 26. In other embodiments, the base interface 48 may present a smaller cross-sectional area than the cylindrical wall of the inner post segment 30. The base interface 48 may be secured to the base 26 through welding, soldering, chemical adhesive, pressure fitting, or the like. In other embodiments, the cylindrical wall may be unitary with the base 26.

The outer post segment 32 of embodiments is a generally elongated cylinder shape, presenting an upper end 50 and a lower end 52, as best shown in FIG. 4. The outer post segment 32 includes a cylindrical wall 54. The cylindrical wall 54 of the outer post segment 32 also presents an inner void 56. The inner void 56 of the outer post segment 32 is configured to receive the inner post segment 30 therein. The outer post segment 32 may include an upper cap 58. The upper cap 58 is disposed atop the outer post segment 32. The upper cap 58 may prevent the mount segment 24 from exceeding the upper end 50 of the outer post segment 32, via an annular protrusion extending laterally from the upper cap 58, as best shown in FIG. 4.

In other embodiments, the inner post segment 30 and the outer post segment 32 may present another shape, other than a circle, about a horizontal cross-section. Examples of this cross-sectional shape includes a square, a rectangle, an ellipse, an arc segment, a triangle, or other shapes.

Figure 6:
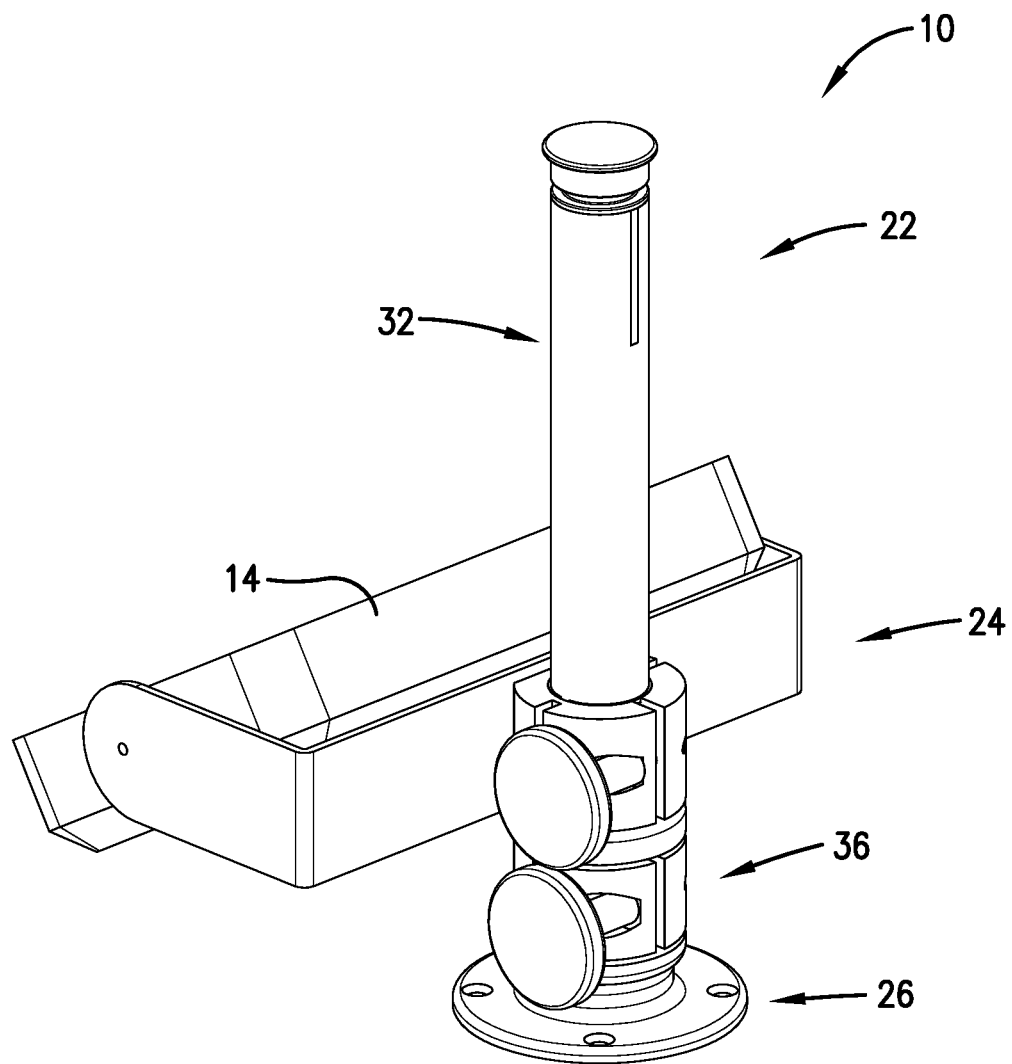
FIG. 6 is a perspective view of the alternative embodiment of FIG. 5, shown in the fully retracted position.
Figure 7:
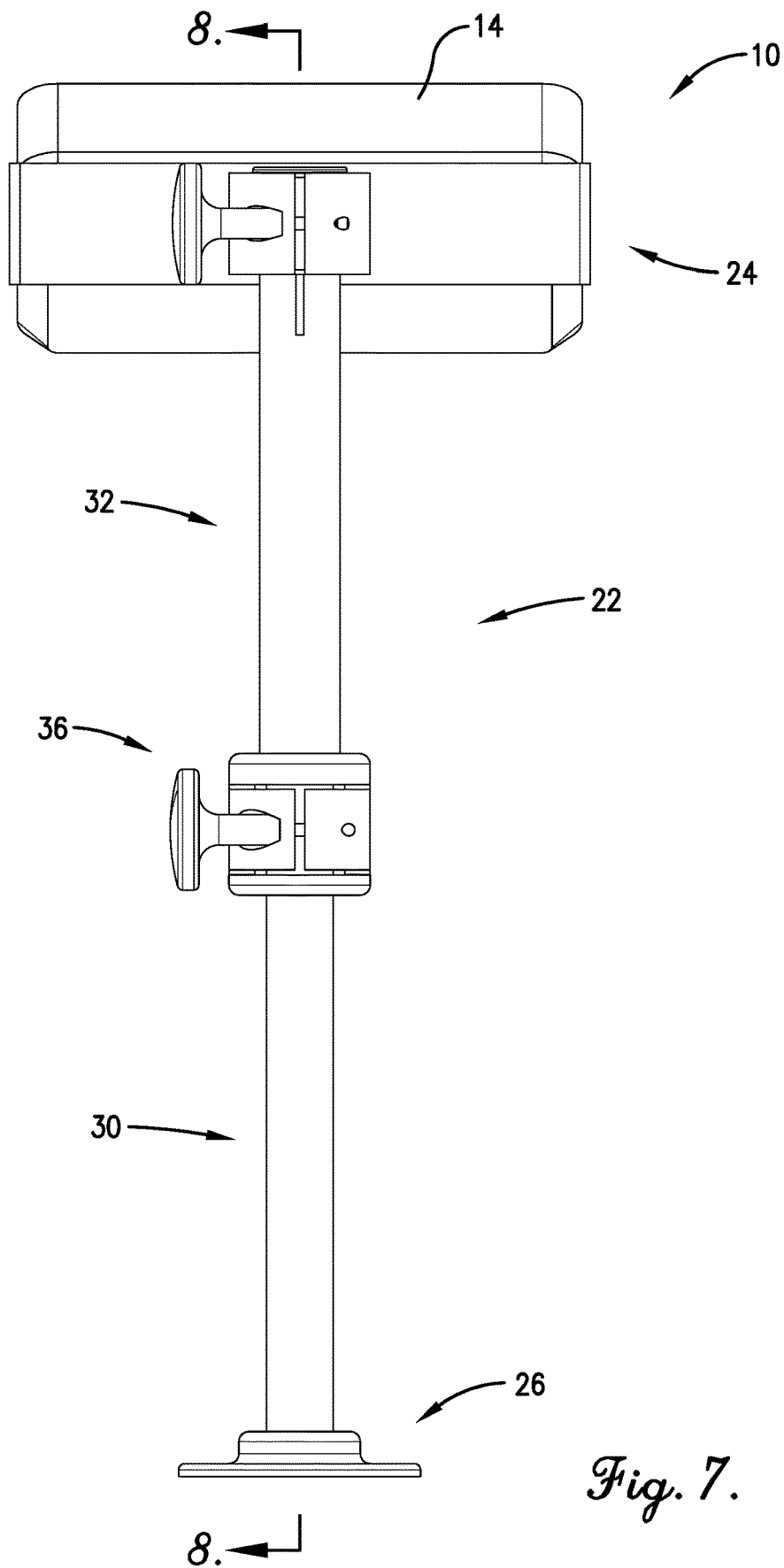
FIG. 7 is a rear view of the alternative embodiment of FIG. 5.
Figure 8:
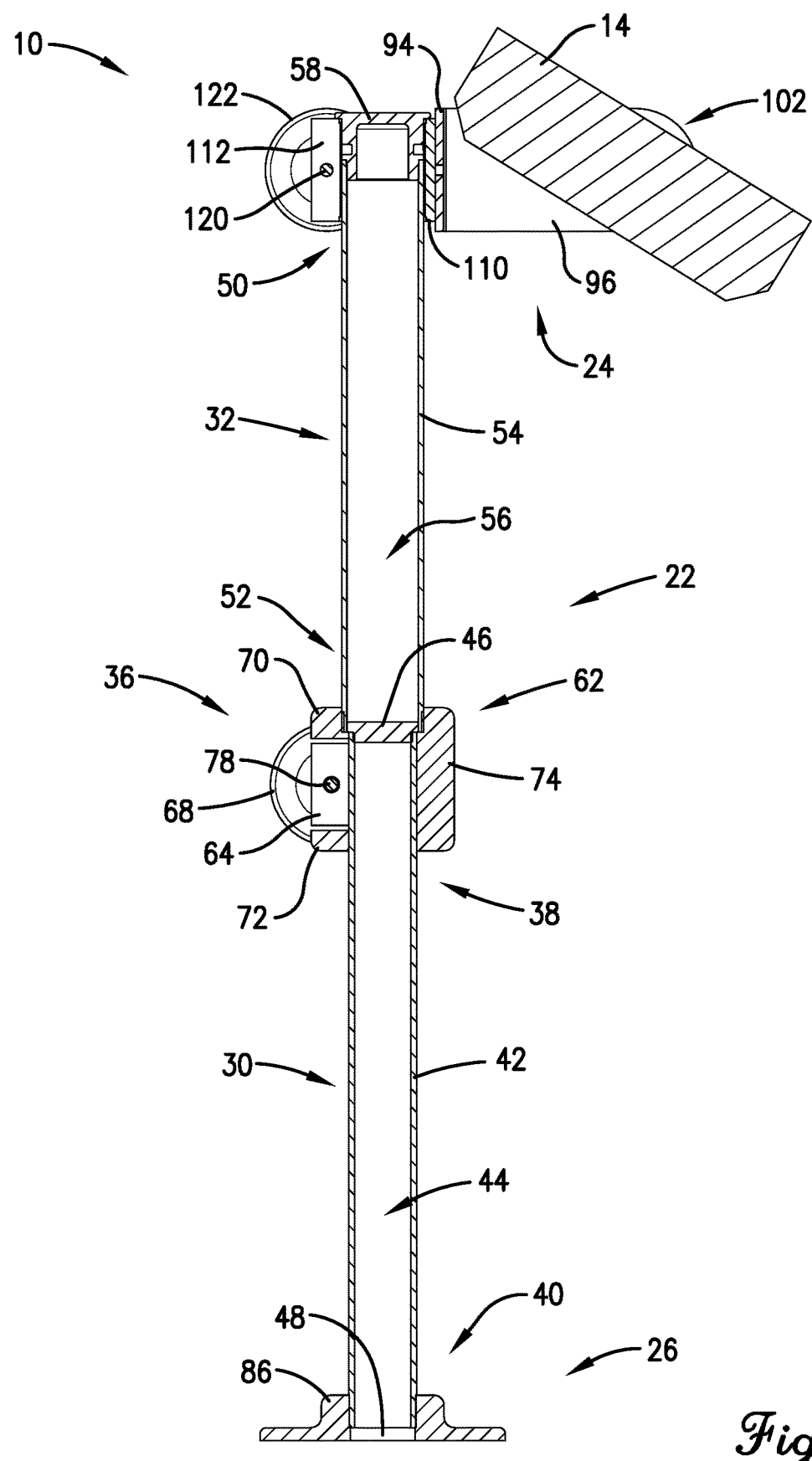
FIG. 8 is a vertical cross-section view of the line 8-8 of FIG. 7, showing internal components of the alternative embodiment of the fully telescoping device mount.
Figure 9:
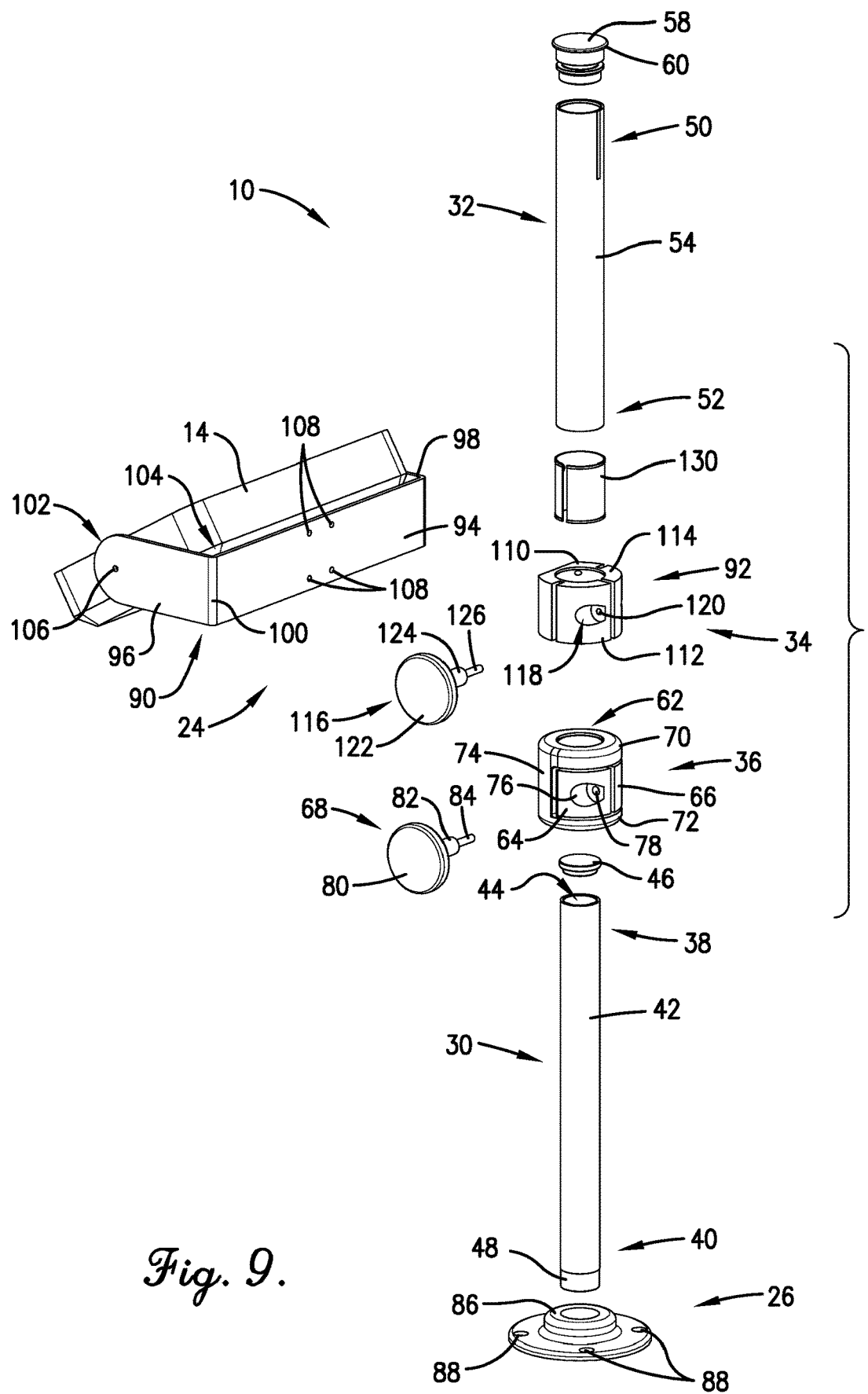
FIG. 9 is an exploded view of the alternative embodiment of the fully telescoping device mount.

The post lock 36 is configured to selectively secure a relative position of the inner post segment 30 and the outer post segment 32. The post lock 36 of embodiments, as best shown in FIG. 6, includes a post collar 62, a first lock segment 64, a second lock segment 66, and a fastener 68. The post collar 62 is permanently secured to the outer post segment 32 and configured to slide along the inner post segment 30. The post collar 62 presents a generally annular shape. In an alternative embodiment, as shown in FIG. 9, the annular shape includes an upper ring 70, a lower ring 72, and a support wall 74. The upper ring 70 is vertically spaced from the lower ring 72 via the support wall 74. A lock void is presented between the upper ring 70, the lower ring 72, and the support wall 74. This embodiment is also shown in FIGS. 5-8. In other embodiments, as shown in FIG. 4, the annular shape includes the upper ring 70 and the support wall 74 without a lower ring.

The first lock segment 64 and the second lock segment 66 occupy at least a portion of the lock void. The first lock segment 64 and the second lock segment 66 are disposed on or otherwise secured to the post collar 62, such as at the support wall 74. The first lock segment 64 and the second lock segment 66 are each vertically spaced from the upper ring 70 and/or the lower ring 72, as best shown in FIG. 8.

As best shown in FIGS. 4 and 9, the first lock segment 64 is laterally spaced from the second lock segment 66. The first lock segment 64 and the second lock segment 66 are each hingedly or pivotably secured to the post collar 62, such as at the support wall 74. The first lock segment 64 and the second lock segment 66 may present a general arc segment shape, complementary to the overall annular shape of the post collar 62. The first lock segment 64 and/or the second lock segment 66 each present a fastener recess 76 and a fastener receptor 78. The first lock segment 64 and the second lock segment 66 apply a clamping force to the inner post segment 30 via the fastener 68.

The fastener 68 of the post lock 36 is tightened into and/or through the respective fastener receptor(s) 78 to reduce a spacing between the first lock segment 64 and the second lock segment 66, as best shown in FIGS. 4 and 9. The reduced spacing applies said clamping force which keeps the inner post secure relative to the outer post. The fastener 68 (as best shown in FIGS. 4 and 9) includes a head 80, a shank 82, and a threaded segment 84. The head 80 presents a flattened cylinder shape configured to be grasped and turned by the fingers of the user. The head 80 may present an angular indicator representative of a current angular position of the head (which may, by extension, be indicative of whether the post lock 36 is in a locked configuration or an unlocked configuration). The shank 82 extends from the head 80 and is configured to fit within the fastener recess 76. The threaded segment 84 (shown bare in the drawings for simplicity) extends from the shank 82 and is configured to fit within the fastener receptor 78. In some embodiments, the first lock segment 64 and the second lock segment 66 are symmetrical, such that the fastener 68 can be inserted into either the first lock segment 64 or the second lock segment 66 and be fastened to the other of the first lock segment 64 and the second lock segment 66. In other embodiments, other types of securing structures may be used for the post lock 36 to selectively secure and release the outer post segment 32. Examples of these other structures may include a flip lock (e.g., a pivoting lever), a twist lock (e.g., an axially rotating structure), or the like.

The base 26 is secured to the inner post segment 30 such that the outer post segment 32 telescopes relative to the inner post segment 30. The base 26 of embodiments presents a generally circular, as best shown in FIG. 6. The base 26 of embodiments includes a raised annular segment 86. The raised annular segment 86 extends upward and is configured to receive the inner post therein. In some embodiments, the raised annular segment 86 may be threaded so as to receive the helical protrusion of the inner post segment 30. In other embodiments, the inner post segment 30 is secured to the base 26 via welding, a chemical adhesive, or the like.

The base 26 may include one or more fastener receptors 88 configured to receive a fastener (not illustrated) therein. The fastener receptor 88 may align with a corresponding opening in the underlying surface 28, such as the foredeck 18 of the boat 12 as shown in FIG. 1. The fastener may be applied directly to the underlying surface 28, such as by screwing into the underlying surface 28.

Exemplary Device Mounts

The mount segment 24 will now be discussed in more detail. As discussed above, the mount segment 24 is configured to be slidably secured to the outer post segment 32 of the telescoping post 22. The mount segment 24 is configured to be fully raised (as shown in FIG. 2) or fully lowered (as shown in FIG. 3) or placed in any intermediate position therebetween. This allows for the electronic device 14 held by the mount segment 24 to be disposed in a high, prominent position for use by the user or in a low, stowed position during non-use.

In embodiments, the mount segment 24 includes a yoke 90 and a collar lock 92. The yoke 90 supports the electronic device 14. The collar lock 92 sets and secures the position of the yoke 90 relative to the telescoping post 22. The collar lock 92 may set the vertical position relative to the telescoping post 22 and/or the angular position (through a horizontal plane) relative to the telescoping post 22. The yoke 90 may also set the angular position (through a vertical plane) of the electronic device 14 relative to the collar lock 92 (as shown in FIG. 13 and discussed more below). In some embodiments, the yoke 90 is provided with the electronic device 14. In these embodiments, the mount segment 24 may include the collar lock 92 of the outer collar 34, to which the user attaches the yoke 90 and the electronic device 14.

The yoke 90 of embodiments presents a general U-shape. The yoke 90 includes a support wall 94, a first protrusion 96, and a second protrusion 98. The first protrusion 96 and the second protrusion 98 each extend from respective ends of the support wall 94. A beveled intersection 100 may be presented between the support wall 94 and the respective protrusion 96, 98. The first protrusion 96 and/or the second protrusion 98 may include an arcuate bevel 102 at a distal end.

The first protrusion 96 and the second protrusion 98 are configured to secure to respective sides of the electronic device 14, as best shown in FIGS. 4 and 9. The first protrusion 96, the second protrusion 98, and the support wall 94 define a channel 104 therein. The electronic device 14 is configured to be disposed within the channel 104 and secured to the first protrusion 96 and the second protrusion 98. The first protrusion 96 and the second protrusion 98 each present a device opening 106. The device opening 106 is configured to be secured to the device via a fastener or other structure (not illustrated). The first protrusion 96 and the second protrusion 98 may be a standard mount type for the electronic device 14.

The yoke 90 includes one or more openings 108 configured to be secured to the collar lock 92 and/or an intermediary plate 109. One or more fasteners (not illustrated) are disposed through the yoke 90 (via the openings 108) and into the collar lock 92 to secure the yoke 90 to the collar lock 92. The intermediary plate 109 may include openings 108 configured to receive fasteners from the intermediary plate 109 to the collar lock 92 and from the intermediary plate 109 to the yoke 90, as best shown in FIG. 4. The intermediary plate 104 allows for the yoke 90 to be easily changed such that other electronic devices 14 may be affixed to the telescoping device mount 10.

The collar lock 92 is configured to selectively secure a relative position of the mount segment 24 and the outer post segment 32. The collar lock 92 of embodiments, as best shown in FIG. 6, includes a collar body 110 having a first lock segment 112 and a second lock segment 114, as well as a fastener 116. The collar lock 92 is permanently secured to the yoke 90 and configured to slide along the outer post segment 32. The collar lock 92 presents a generally annular shape.

The first lock segment 112 and the second lock segment 114 occupy are disposed laterally from each other. The first lock segment 112 and the second lock segment 114 are disposed on or otherwise secured to the collar body 110. The first lock segment 112 is laterally spaced from the second lock segment 114. The first lock segment 112 and the second lock segment 114 are each hingedly or pivotably secured to the collar body 110. The first lock segment 112 and the second lock segment 114 may present a general arc segment shape, complementary to the overall annular shape of the post collar 62. The first lock segment 112 and/or the second lock segment 114 each present a fastener recess 118 and a fastener receptor 120. The first lock segment 112 and the second lock segment 114 apply a clamping force to the inner post segment 32 via the fastener 116.

The fastener 116 of the collar lock 92 is tightened into and/or through the respective fastener receptors to reduce a spacing between the first lock segment 112 and the second lock segment 114. The reduced spacing applies said clamping force which keeps the collar body 110 secure relative to the outer post segment 32. The fastener 116 (as best shown in FIGS. 4 and 9) includes a head 122, a shank 124, and a threaded segment 126. The head 122 presents a flattened cylinder shape configured to be grasped and turned by the fingers of the user. The head 122 may present an angular indicator (as illustrated in FIG. 9) representative of a current angular position of the head 122 (which may, by extension, be indicative of whether the post lock 36 is in a locked configuration or an unlocked configuration). The shank 124 extends from the head 122 and is configured to fit within the fastener recess 118. The threaded segment 126 (shown bare in the drawings for simplicity) extends from the shank 124 and is configured to fit within the fastener receptor 120. In some embodiments, the first lock segment 112 and the second lock segment 114 are symmetrical, such that the fastener 116 can be inserted into either the first lock segment 112 or the second lock segment 114 and be fastened to the other of the first lock segment 112 and the second lock segment 114.

In embodiments, the collar lock 92 includes one or more bearings configured to assist the collar body 110 in sliding along and/or rotating relative to the outer post segment 32, as shown in FIGS. 4 and 9. In some embodiments, the collar lock 92 includes a linear bearing 128 and a locking bearing 130. The linear bearing 128 and the locking bearing 130 are each disposed on an interior surface of the collar body 110 so as to reduce friction between the collar body 110 and the cylindrical wall 54 of the outer post segment 32. The locking bearing 130 is disposed within first lock segment 112 and the second lock segment 114 to aid in the clamping. The linear bearing 128 is disposed above the locking bearing 130 and within the collar body 110. The linear bearing 128 assists with linear movement of the collar body 110 relative to the outer post segment 32, as well as rotation about the outer post segment 32.

In some embodiments, as best shown in FIGS. 2-4, the collar lock 92 includes a secondary fastener 132. The secondary fastener 132 is selectively releasable to aid in rotation of the collar lock 92 about the outer post segment 32. The secondary fastener 132 is frictionally held against the linear bearing 130. The user may thus release the secondary fastener 132 to rotate the electronic device 14 about the outer post segment 32.

In embodiments, as shown in FIG. 4, the post lock 36 may also include one or more bearings to assist in sliding along and/or rotating relative to the inner post segment 30, as shown in FIG. 4. In some embodiments, the post lock 36 includes a linear bearing 134 and a locking bearing 136. The linear bearing 134 and the locking bearing 136 are each disposed on an interior surface of the post lock 36 so as to reduce friction between the post collar 62 and the cylindrical wall 42 of the inner post segment 30. The locking bearing 136 is disposed within first lock segment 64 and the second lock segment 66 to aid in the clamping. The linear bearing 134 is disposed above the locking bearing 136 and within the post collar 62. The linear bearing 134 assists with linear movement of the post collar 62 relative to the inner post segment 30, as well as rotation about the inner post segment 30.

In other embodiments, as shown in FIG. 9, the collar lock 92 may include a single linear bearing 128 which also functions as the locking bearing. Further, the post lock 36 may not include a bearing.

It should be appreciated that the fastener 68 of the post lock 36 may be the same size and shape as the fastener 116 of the collar lock 92, such that the two fasteners 68, 116 are interchangeable. In other embodiments, other types of securing structures may be used for collar lock 93 to selectively secure and release the mount segment 24. Examples of these other structures may include a flip lock (e.g., a pivoting lever), a twist lock (e.g., an axially rotating structure), or the like.

In other embodiments, another type of device mount may be used in lieu of the yoke 90. Depending upon the type of electronic device 14 to be mount, any of numerous types of device mount structures may be selected. As discussed above, the electronic device 14 may include the yoke 90, such that the electronic device 14 and the yoke 90 are secured to the telescoping device mount 10.

Exemplary Alternative Embodiments

Turning to FIGS. 10-14, various alternative embodiments of the invention (beyond those discussed above) are shown and will be briefly described herein. It should be appreciated that the alternative embodiments discussed herein may share various characteristics with the above-discussed embodiment, or with other embodiments described herein. The alternative embodiments are discussed to provide additional examples of embodiments to the reader. The alternative embodiments should not be interpreted as a preferred or a non-preferred embodiment.

Figure 10:
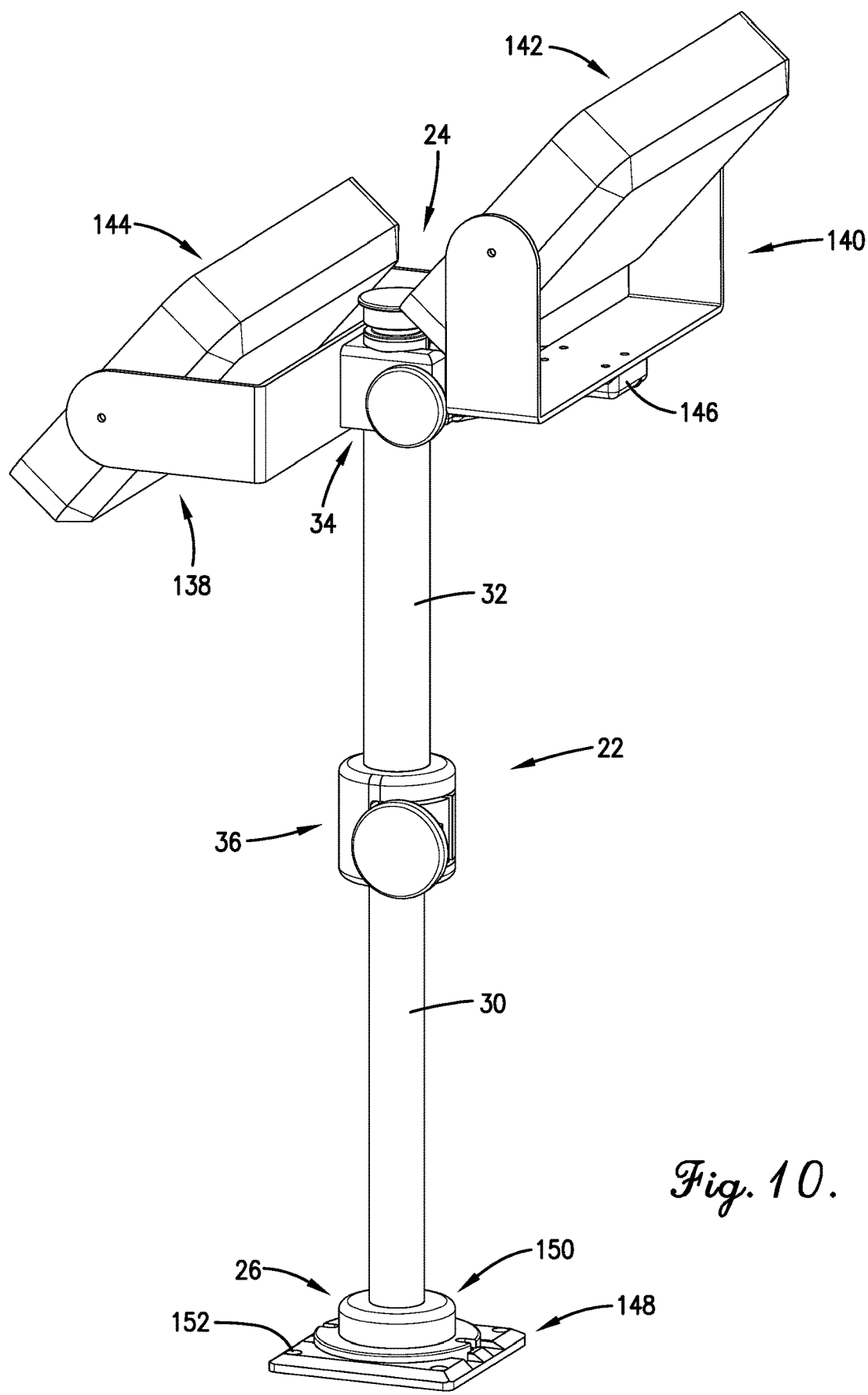
FIG. 10 is a perspective view of a second alternative embodiment of a fully telescoping device mount, configured to support two distinct electronic devices, shown in the fully extended position.

As shown in FIG. 10, a first alternative embodiment may be a telescoping device mount 10 configured to support two electronic devices 14 (which may be referred to as a "dual-device embodiment"). The dual-device embodiment includes a mount segment 24 that is configured to secure two distinct and/or disparate electronic devices 14. The telescoping post 22 of the dual-device embodiment may be similar to the telescoping post 22 described above. The mount segment 24 of this embodiment includes the collar lock 92, a first yoke 138, and a second yoke 140. As can be seen in FIG. 10, the first yoke 138 may be oriented horizontally and the second yoke 140 may be oriented vertically. This arrangement allows for the viewing of the electronic devices 14 in a staggered manner. A second electronic device 142 (secured to the second yoke 140) is thus disposed above a first electronic device 144 (secured to the first yoke 138). The collar lock 92 may include a second yoke mount 146 extending therefrom. The second yoke mount 146 extends horizontally from the collar lock 92 so as to provide structure support to the vertically extending second yoke 140. In some embodiments, the collar lock 92 of the dual-device embodiment may present a square prism shape (in lieu of the cylindrical shape shown in FIGS. 2-6 and 9) to support the second yoke mount 146.

Other embodiments (not illustrated) may be configured to secure three or more electronic devices 14. Still other embodiments may be configured to secure electronic devices 14 of different sizes and shapes. Thus, these embodiments may be customizable, in which the user may select a yoke 90 configured to support the specific electronic device or electronic devices 14 which the user intends to utilize.

Figure 11:
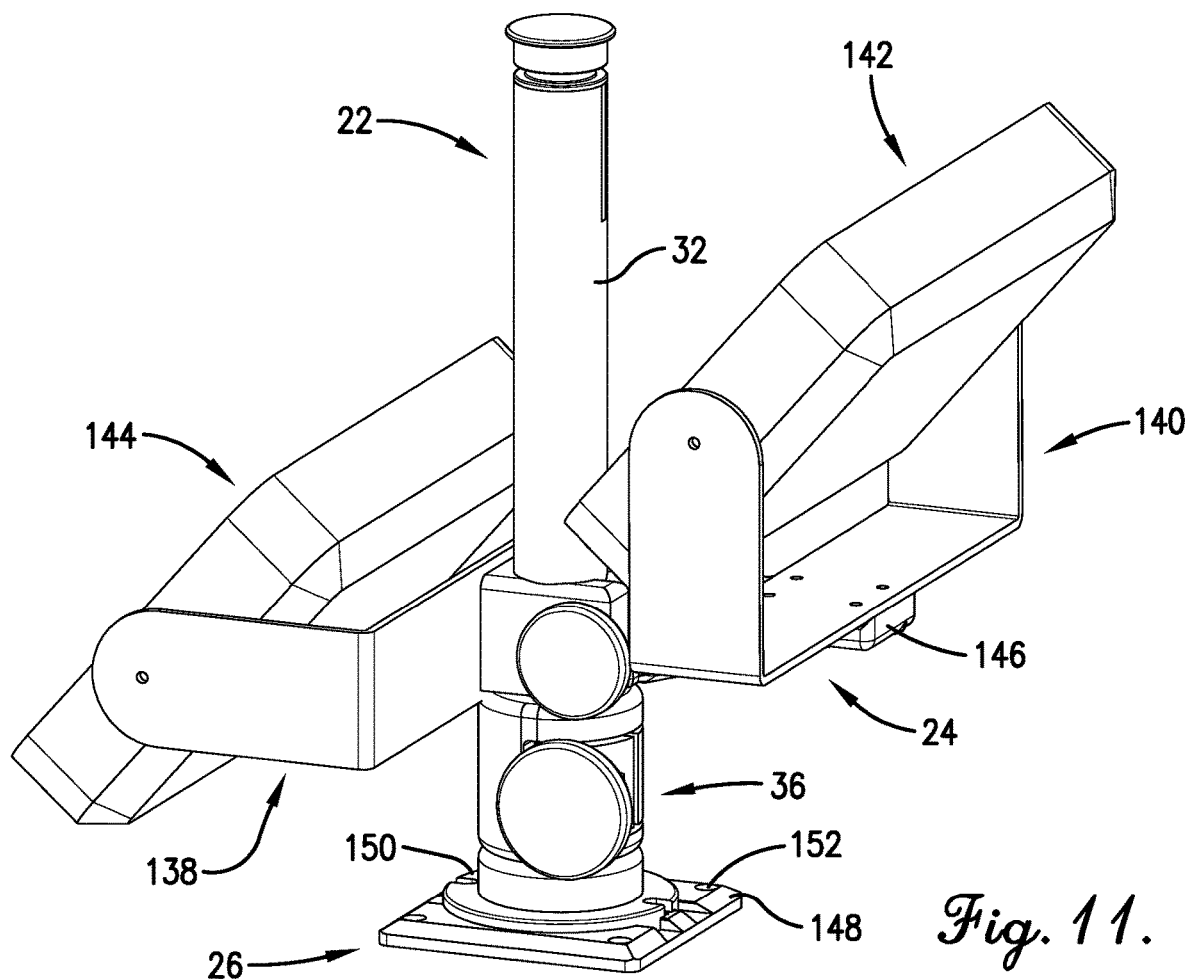
FIG. 11 is a perspective view of the alternative embodiment of FIG. 10, shown in the fully retracted position.

As shown in FIG. 11, the dual-device embodiment may be lowered to a fully retracted position similarly to the single-device embodiment (as shown in FIGS. 3 and 6). As shown, as least a portion of the telescoping post 22 extends above the mount segment 24 when in the fully retracted position. As such, the telescoping post 22 may be grasped if needed (e.g., to perform functions of a stanchion).

Figure 12:
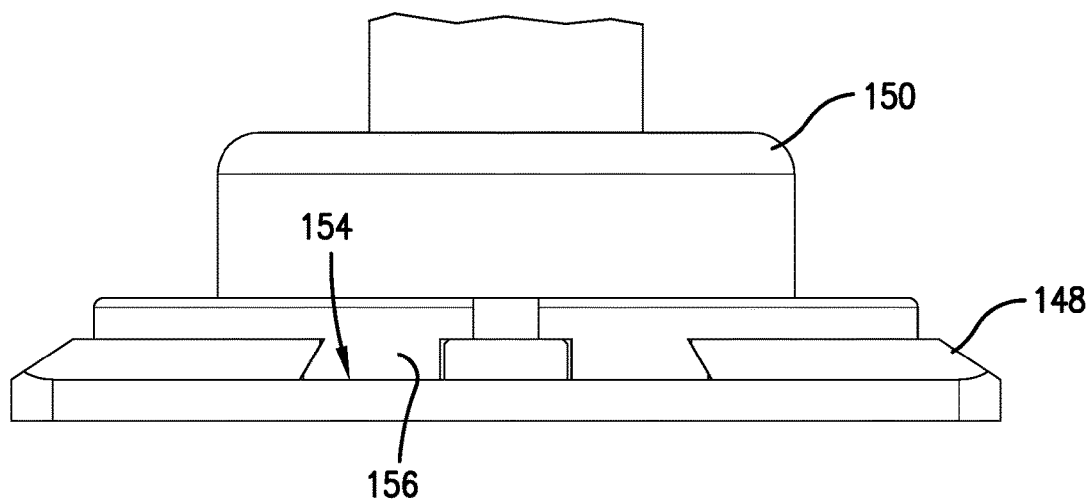
FIG. 12 is a rear view of a base of the alternative embodiment of FIG. 10, showing a selectively removable base.

As shown in FIG. 12, an alternative embodiment of the base 26 is shown. It should be noted that the alternative embodiment of the base 26 is also shown in FIGS. 10-11. While the base 26 shown in FIGS. 2-9 is configured to be permanently installed, the alternative embodiment of the base 26 is configured to allow for removal and installation of the telescoping post 22 as needed. The base 26 of these embodiments includes a lower base 148 and an upper base 150. The lower base 148 is permanently secured to the underlying surface 28, such as via a set of openings 152, as shown in FIGS. 10 and 11. The upper base 150 is permanently secured to the telescoping post 22. The upper base 150 is selectively secured to the lower base 148, such that the upper base 150 may be removed from the lower base 148 as needed. The lower base 148 presents two or more channels 154 therein configured to receive a complementary protrusion 156 of the upper base 150 (or vice-versa).

FIGS. 13 and 14 show alternative embodiments of the yoke 90. FIG. 13 shows an angled embodiment, in which the first protrusion 96 and the second protrusion 98 are at a raised angle. The support wall 94 is also disposed at an angle relative to the telescoping post 22 (not shown in this figure). The raised angle may allow for a different field of view of the electronic device 14 (not shown in this figure). The yoke 90 of this embodiment may include an angular spacer 158 including a brace 160 and a reinforcing wall 162. The brace 160 is secured to the intermediary plate 109 (such as via a fastener through the openings 108) and to the support wall 94. The reinforcing wall 162 is disposed between respective ends of the brace 160.

FIG. 14 shows an alternative embodiment of the yoke 90 of the double-device embodiment discussed above. In this embodiment, a second yoke 140 is secured to a first yoke 138. The second yoke 140 includes two linear spacers 164 that extend from the support wall 94 of the second yoke 140. The two linear spacers 164 may each include an opening 166 configured to allow the secondary fastener 132 (not shown in this figure) to pass therethrough. It should be appreciated that the secondary fastener 132 utilized with these embodiments may be longer than the secondary fastener 132 illustrated in FIG. 4. The two linear spacers 164 are both secured to the intermediary plate 109 via fasteners (not illustrated). This allows the user to add onto the embodiment shown in FIG. 13 to be the embodiment shown in FIG. 14, such that the user may add a second electronic device 134 (shown in FIG. 10) to the telescoping device mount 10.

Exemplary Methods of Use

While various methods of using the embodiments of the invention have been discussed throughout, a method of utilizing an electronic device on a vehicle will now be discussed. Embodiments of the invention are directed to the method discussed herein. Other embodiments of the invention may be directed to other methods. Additional steps may be added or removed. Steps may be performed in any order.

Some embodiments of the method of utilizing an electronic device on a vehicle comprise releasing a post lock 36 of a telescoping post 22; raising an outer post segment 32 relative to an inner post segment 30, wherein the inner post segment 30 is secured to the vehicle via a base 26; releasing a collar lock 92 of a device mount; raising the mount segment 24 relative to the outer post; and altering an angle of a device in the mount segment 24 relative to the telescoping post 22. The post lock 36 may be released by rotating a head of a fastener associated with the post lock 36 or may be released by some other structure. The outer post segment 32 may be raised by grasping the outer post segment 32 by the user. The collar lock 92 may be released by rotating a head of a fastener associated with the collar lock 92. The mount segment 24 may be raised by grasping the mount segment 24 and/or the electronic device secured therein. Altering the angle may be performed by grasping the electronic device and inducing a pivot relative to the mount segment 24.

The method may further include steps such as securing the post lock 36 and the collar lock 92 in the desired locations, which may be at intermediate locations. The method may further include steps such as setting an angle of the mount segment 24 (about a horizontal plane) and tightening the collar lock 92 at the angle (such as via a secondary fastener 132). The method may further include selecting the mount segment 24 based at least in part on the electronic device 14; securing the electronic device 14 within the mount segment 24; and emplacing the mount segment 24 over the telescoping post 22. The mount segment may be selected based upon the size, shape, display angle, and other display characteristics of the electronic device 14. In some embodiments, the user may select a yoke 90 to then be secured to the outer collar 34, such that the outer collar 34 is permanently attached to the telescoping post 22 and secured to the yoke 90 via the intermediary plate 109 via the set of openings 152, as shown in FIGS. 10 and 11.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claim(s) set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in the paragraph shall apply unless so stated in this description and/or except as will be readily apparent to those skilled in the art from the description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

We claim:

1. A telescoping device mount configured to hold an electronic device on a vehicle, the telescoping device mount comprising:
   a telescoping post including an inner post segment and an outer post segment;
   a mount segment configured to secure the electronic device thereto,
   said mount segment including an outer collar slidably securable to an outer surface of the outer post segment of the telescoping post; and
   a base secured to the inner post segment such that the outer post segment telescopes relative to the inner post segment.

2. The telescoping device mount of claim 1,
   wherein the mount segment is configured to be raised relative to the base in a fully extended position,
   wherein the mount segment is configured to be proximate to the base in a fully retracted position.

3. The telescoping device mount of claim 2, wherein at least a portion of the telescoping post extends above the mount segment while the mount segment is in the fully retracted position.

4. The telescoping device mount of claim 1, wherein the vehicle is a boat.

5. The telescoping device mount of claim 4, wherein the electronic device is an electronic fish finder.

6. The telescoping device mount of claim 1, wherein the telescoping post includes:
   a post lock configured to selectively secure a relative position of the inner post segment and the outer post segment.

7. The telescoping device mount of claim 1, wherein the mount segment includes:
   a collar lock configured to selectively secure a relative position of the mount segment and the outer post segment, wherein the collar lock includes—
   a first lock segment;
   a second lock segment; and
   a fastener disposed through the first lock segment and into the second lock segment.

8. The telescoping device mount of claim 1,
   wherein said electronic device is a first electronic device,
   wherein said mount segment is further configured to secure a second electronic device thereto,
   wherein the mount segment includes a first yoke associated with the first electronic device and a second yoke associated with the second electronic device.

9. The telescoping device mount of claim 1, wherein the mount segment further includes—
   an intermediary plate configured to allow for removal of a yoke holding the electronic device.

10. A method of utilizing an electronic device on a vehicle, the method comprising:
    releasing a post lock of a telescoping post;
    raising an outer post segment relative to an inner post segment,
    wherein the inner post segment is secured to the vehicle via a base;
    releasing a collar lock of a mount segment that is slidably engaged around an outer surface of the outer post;
    raising the mount segment relative to the outer post segment; and
    altering an angle of the electronic device in the mount segment relative to the telescoping post.

11. The method of claim 10, further comprising:
    fully retracting the telescoping post; and
    lowering the mount segment such that the electronic device is proximate to the vehicle.

12. The method of claim 11, further comprising:
    tightening the post lock of the telescoping post in a desired location relative to the inner post segment; and
    tightening the collar lock of the mount segment in a desired location relative to the outer post segment.

13. The method of claim 10, further comprising:
    setting an angle of the mount segment relative to the vehicle about a horizontal plane; and
    tightening the collar lock at said angle.

14. The method of claim 10, further comprising:
    selecting the mount segment based at least in part on the electronic device;
    securing the electronic device within the mount segment; and
    emplacing the mount segment over the telescoping post.

15. A mounted electronic device system configured to be secured to a vehicle, comprising:
    an electronic device having a display; and
    a telescoping device mount configured to hold the electronic device, said telescoping device mount including—
    a telescoping post including an inner post segment and an outer post segment;
    a mount segment configured to secure an electronic device thereto, said mount segment including an outer collar slidably securable around an outer surface of the outer post segment of the telescoping post; and a base secured to the inner post segment such that the outer post segment telescopes relative to the inner post segment, wherein the base is configured to be secured to the vehicle, wherein the telescoping device mount is configured to be disposed in a full retraction position and a full extension position, wherein in the full retraction position the electronic device is proximate to the vehicle.

16. The mounted electronic device system of claim 15, wherein at least a portion of the telescoping post extends above the mount segment while the mount segment is in the full retraction position.

17. The mounted electronic device system of claim 15, wherein the vehicle is a watercraft, wherein the electronic device is an electronic fish finder.

18. The mounted electronic device system of claim 15, wherein the telescoping post includes:

a post lock configured to selectively secure a relative position of the inner post segment and the outer post segment, wherein the mount segment includes:

a collar lock configured to selectively secure a relative position of the mount segment and the outer post segment.

19. The mounted electronic device system of claim 15, wherein the collar lock and the post lock both include— a first lock segment;

a second lock segment; and a fastener disposed through the first lock segment and into the second lock segment.

20. The mounted electronic device system of claim 15, wherein said electronic device is a first electronic device, wherein said mount segment is further configured to secure a second electronic device thereto, wherein the mount segment includes a first yoke associated with the first electronic device and a second yoke associated with the second electronic device.

* * * * *